US005440624A

United States Patent [19]

Schoof, II

[11] Patent Number: 5,440,624
[45] Date of Patent: Aug. 8, 1995

[54] METHOD AND APPARATUS FOR PROVIDING ADAPTIVE ADMINISTRATION AND CONTROL OF AN ELECTRONIC CONFERENCE

[75] Inventor: C. John Schoof, II, Tucson, Ariz.

[73] Assignee: NetMedia, Inc., Tucson, Ariz.

[21] Appl. No.: 974,186

[22] Filed: Nov. 10, 1992

[51] Int. Cl.$^6$ ............................................. H04M 3/56
[52] U.S. Cl. ..................................... 379/202; 379/201; 379/203
[58] Field of Search .............. 379/202, 203, 204, 205, 379/206, 131, 192, 201; 348/14, 15, 16, 17; 370/62

[56] References Cited

U.S. PATENT DOCUMENTS 4,964,157  10/1990  Aoshima .......................... 379/204
5,034,947   7/1991  Epps ................................ 370/62

FOREIGN PATENT DOCUMENTS 404082357  3/1992  Japan .............................. 370/62

*Primary Examiner*—James L. Dwyer
*Assistant Examiner*—Scott Wolinsky
*Attorney, Agent, or Firm*—Ogram & Teplitz

[57] ABSTRACT

A method and apparatus to conduct automatically, and moderate absolutely, a networked electronic conference to provide order, maintain constant control, and ensure the best dissemination of information possible. A defined but flexible rule base governs the conference, as executed and interpreted by a conference controller. The rule base comprises a multitude of conference management options and techniques. A main feature of the preferred embodiment is the ability to govern a conference according to a sequence-ordering scheme as defined in the rule base. This conference administration system is independent of the physical implementation of the media or network interconnecting the participants to a conference. Further, it is not limited to the use of any particular means of communication (i.e., voice, textual data, graphical data, etc.). Security features are provided, and an archived record of conference proceedings is maintained for playback review of the conference, with the option to playback the archived record at a normal recorded rate of speed, at a different rate of speed for voice recordings, or keyed on selective item criteria for an enhanced review of the recorded conference communications and proceedings.

33 Claims, 7 Drawing Sheets

METHOD AND APPARATUS FOR PROVIDING ADAPTIVE ADMINISTRATION AND CONTROL OF AN ELECTRONIC CONFERENCE

TECHNICAL FIELD

This invention relates in general to electronic communications and in particular to apparatus and methods for conducting electronic conferences.

BACKGROUND OF THE INVENTION

It is difficult under the best of circumstances to have a well organized, efficient business meeting. All over the world, companies are spending millions of dollars annually just for the time necessary to get a few people together around a table for a meeting. If employees have to drive, or worse yet, fly to meetings, the expense goes up extremely fast; and the number of meetings and the amount of time lost is generally proportional to the size of the company. It is no wonder that telephone conference calls have become so popular.

However, meetings held by a telephone conference call have their own frustrating and sometimes serious problems. Chief among these problems is the anarchy that generally prevails in the present day telephone conference call environment due to a lack of absolute control over the means and methods of the conference. Constant interruptions of participants, confusion over who said what, and the fact that the person who speaks the loudest usually gets to talk, can make telephone conference meetings very inefficient and often painful.

In addition to the lack of discipline in the conduct of a telephone conference call, a conference held by voice alone generally is incapable of adequately describing much of the material included in the conference. For example, a graphic illustration can communicate precisely and quickly a concept that words alone will struggle to express. Thus, in voice communication alone, much is left to the imagination of the listener and the participants may get very different views of what has been said in a conversation.

Along with telephone conferencing, computer terminal conferencing has also become a reality in some settings. In computer terminal conferencing, participants type information on a computer keyboard to communicate to other conference participants. A message typed is textually displayed on participating computer terminal display devices. Communication via computer keyboards and display terminals has even extended to graphical interactions (i.e., electronic white boards), using other suitable computer input devices to transmit graphics to participating computer terminal display devices.

Although many of the existing computer terminal conferencing systems have the terminals grouped within close proximity of each other, computer bulletin board systems (BBS) exist that allow remotely located individuals to communicate with each other to some extent. In a crude and limited sense, a form of conferencing occurs through BBS communication means. Individuals can send electronic messages to the BBS, and read messages left on the BBS by other users.

However, BBS's are not capable of acting as an effective governor to moderate and administer to a multiplicity of conferencing needs. For example, a BBS cannot control the sequence-ordering of individuals communicating with each other in any fashion other than by a basic first-come first-served methodology or by limiting the time of day an individual may log-in. A BBS is not capable of defining who will be able to communicate when, relative to others communicating, in a real-time conferencing fashion. Any communication that occurs among individuals through a BBS, that is an attempt to emulate a real-time "conference" session, is at most only comparable to computer terminal conference systems as previously discussed.

Such systems simply do not offer any aspects of control or governing of communications among participants, such as who speaks when and for how long. They do not offer administrative functions such as enforcing who is authorized to join which conference session, or controlling when such a session is to occur, or for how long. Nor are they able to moderate communications to insure each individual in the conference is offered a fair opportunity to speak and be heard. They only offer crude administrative functions, such as time of day log-in and restrictions on who can access what files.

In conjunction with computer communication conferencing options, if the conference participants are physically grouped close together they may optionally verbally communicate with each other even while using the electronic communication. This allows for a choice of communication means during the conference (i.e., electronic or verbal). Further, a human moderator may be appointed to verbally intervene in an attempt to control the conference proceedings.

Finally, there are fixed station video conference terminals for scheduled meetings. However, such terminals are extremely expensive, few in number, and not available on a wide geographical basis.

Regardless of the physical means and methods employed, none of the existing conferencing approaches has been completely satisfactory. Although electronic conferencing means has been implemented, combined with human administration or moderation, conference chaos can still exist due to a lack of absolute control over the means and methods of the conference.

SUMMARY OF THE INVENTION

According to principles of the present invention, in its preferred embodiment, a networked electronic conference can be conducted automatically and moderated precisely to provide order, to maintain constant control, and to ensure the best dissemination of information possible. Advantageously, a defined, but flexible, rule base governs the conference operations. This rule base is interpreted and executed by a conference controller communications apparatus.

The rule base comprises a plurality of sets of conference rules which are selectively invoked by a conference governor operator, or a conference controller apparatus, at the beginning of a conference and at any time during a conference. This rule base is interpreted by the conference administration system. The conference controller process executes on a conference controller communications apparatus, to execute and administer the conference automatically and absolutely without any other operator intervention. Moreover, a conference is optionally initiated with one set of rules, and after a passage of time or upon the occurrence of a specified condition, a different set of rules is invoked by the system or the operator.

Organizing a conference according to a set of rules, and executing it via computer apparatus provides absolute structure to meetings. In addition, it provides record keeping, vote-taking, privacy and security functions that can multiply the effectiveness of any meeting. This invention unites two of the most important business technologies—computer networks and communications.

Although one embodiment of the invention utilizes simple touch-tone audio telephones, the preferred embodiment allows the integration of digital data from any source. Telephone users and networked computer users can participate in the same conference. Computer users have the added advantage of being able to present computer based data in the conference. Spreadsheets, charts, document images, and even digitized voice and full motion video can be used to increase the impact of the conference. In addition, the invention provides for the addition of services based on the processing of the digital data, such as language translation, transcription and digital storage of a complete record of the conference.

The rule base comprises a multitude of conference management options and techniques. Depending on the embodiment implemented, a range of rules is available. In accordance with general principles of the present invention, a set of rules is selected to manage the sequence-ordering of participant communication. This sequence-ordering defines who has the floor to speak first and who has it next.

Each participant's allotted time-period for speaking is also selected. The conference administration system automatically and precisely executes the rule base so that each participant has the floor at the appropriate moment and for the correct amount of time.

Other conference management options and techniques are defined in the rule base to govern and moderate a conference. For example, if specified in the rule base, participants are allowed to interrupt the current speaker; participant interruption requests are queued up; more speaking time is granted should it be requested; and digitized voice data is scrambled to allow for anonymity. Any number of other conferencing management options are available to be defined in the rule base, including the changing of the rule base governing the conference at a specified time or upon a specified event to allow for dynamic conference management techniques.

In accordance with another aspect of this invention, the conference administration system is independent of the physical implementation of the media or network interconnecting the participants to a conference. Further, it is not limited to the use of any particular means of communication (i.e., voice, textual data, graphical data, etc.). For example, remote conference participants are connected via networked computers wherein each participant communicates, according to the established rule base, either verbally by using computer integrated and digitized voice phone capabilities; keyboard input for text only messages; or an electronic whiteboard for graphical displays. Further, a participant optionally calls into the conference from any standard telephone system, and yet is subject to the established rule base also.

In accordance with another aspect of this invention, a complete archived record of the conference communications is maintained, and access is permitted, optionally, to the archived record either during the conference or anytime after completion of the conference. This assures the best dissemination of conference information possible. Anyone authorized can examine the conference record in any desired degree of detail and, optionally, at alternate rates of playback speed without distortion of voice recordings.

Moreover, the conference archived record is optionally reviewed in its entirety, or selectively by keyed items. Reviewing the archived record based on selected keyed items allows for focusing on particular aspects of communication that has occurred during the conference, and allows for automatically skipping over undesired portions of information. A keyed item is any data defined to be associated with certain archived record data by which the associated data may be retrieved based upon selection of the keyed item data. For example, those communications made only by a particular participant may be selected for review, thereby ignoring communications not associated with that participant. The keyed item data is the participant's name, and the associated data to be retrieved is the communications made by that identified participant.

An active conference participant can go back in the conference archived record to clarify details at anytime during an ongoing conference. The record is reviewed in its entirety, or optionally, it is reviewed based on keyed item criteria information to focus only on what a particular participant has said.

A participant who enters a conference after the starting time is able to review the record in the background at an accelerated speed, while the conference continues, to catch-up on what has previously occurred and thereafter actively participate in the conference. Furthermore, anyone else who missed a conference and who is authorized to access the record of a conference, is able to review the record after completion of the conference.

In accordance with another aspect of this invention, security is provided to allow only defined participants to be admitted to the conference. For example, passwords or security codes are required to determine access authority from any electronic means such as computer, telephone, etc.

The invention, together with various embodiments thereof, will be more fully described by the drawings and their associated descriptions.

DETAILED DESCRIPTION OF THE INVENTION

Figure 1A:
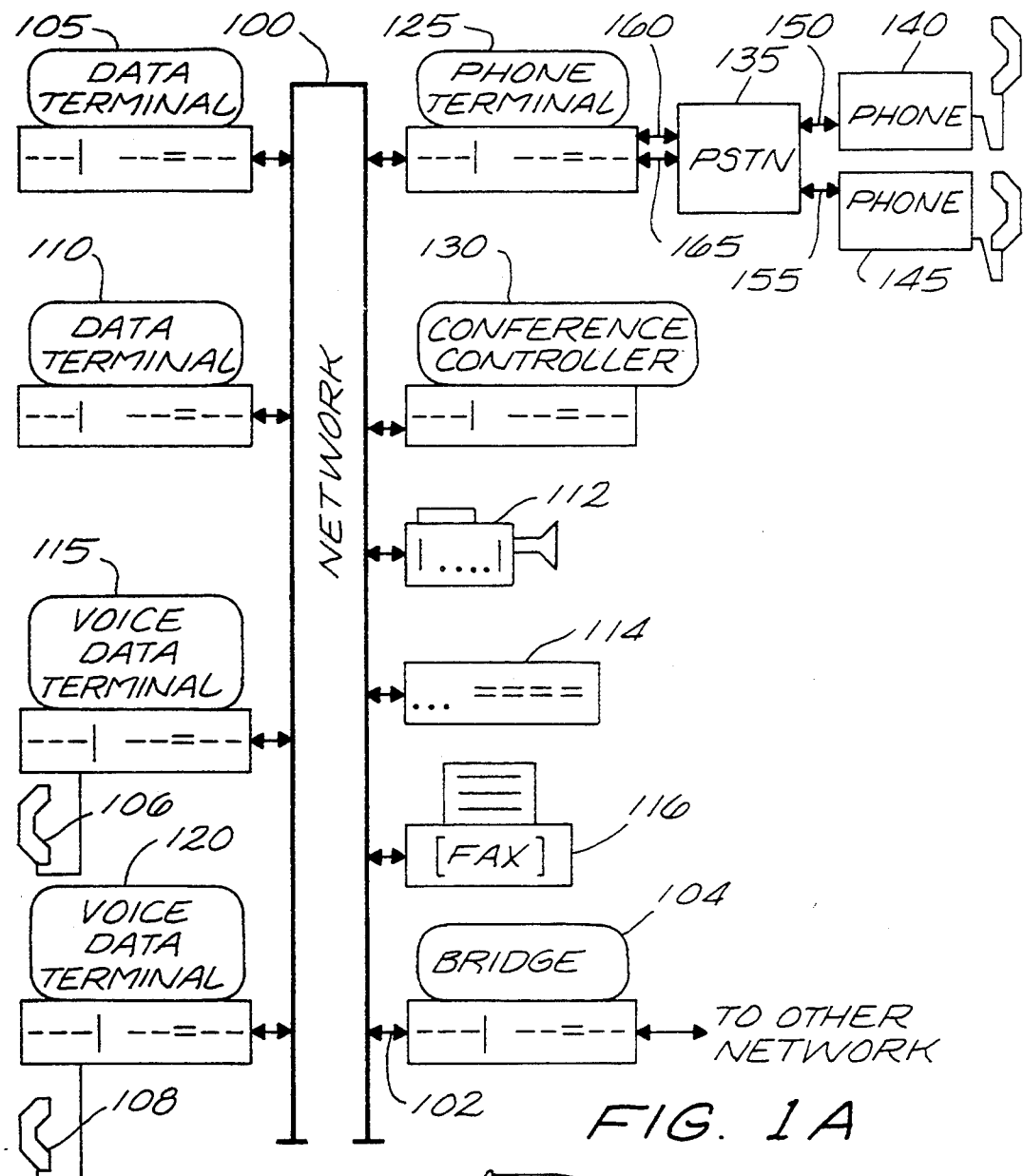
FIG. 1A is a schematic block diagram illustrative of a communications network and apparatus of one embodiment of the invention over which a conference is carried out.

FIG. 1A is a schematic block diagram illustrative of a communications network and apparatus of one embodiment of the invention over which a conference is automatically carried out, administered and moderated according to general principles of the invention.

Solely for the purpose of illustrating the principles of the invention, network 100 is a peer-to-peer network serving a variety of different terminal communications devices. In alternate embodiments, network 100 is a stand alone network or it is connected to other networks via the path 102 and a bridge 104. In the present embodiment, the conference administration system is entirely network independent.

The information which is conveyed over network 100 during the course of a conference comprises digital data from any one of a large number of different types of data sources. As types of operator interfaces, conference information may be audio information from any source, such as microphones, speakers, and telephone handsets 106 and 108; video information from both live cameras 112 and stored video sources 114; computer screens 105 and 110 of text and graphics; television screens; radio; fax 116; news/wire market data and signals from a large variety of sensors for monitoring any type of human or physical activity. Information of any type which can be processed, heard or displayed and originating from any source can be exchanged during a conference.

In the following discussion, the "governor" is a communications apparatus that administers a conference in accordance with the invention. A "participant" is a person, a group of persons, or a communications apparatus that takes part in a conference. A participant either listens to the conference proceedings, or provides information input to the proceedings at an assigned time according to a sequence-ordering scheme.

Any one or all of the various communications terminals 105, 110, 115, 120, 125 and 130 participate in a conference. For purposes of illustration only, terminal 130 is designated as "Conference Controller". A conference controller is equipped with "conference controller" software, memory 500 for storing participant information data, rule base data, an archived record of a conference, and optionally, facilities such as translation and transcription facilities for processing conference data. Any of the terminals 105, 110, 115, 120 and 125 can also be equipped to serve as a conference controller.

Figure 1B:
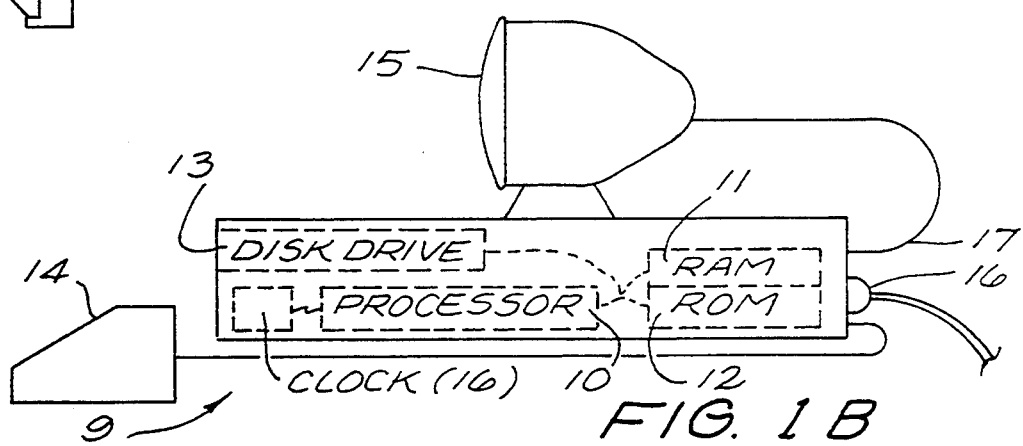
FIG. 1B is a schematic block diagram illustrative of a terminal communications device.

Each of the terminals 105, 110, 115, 120, 125 and 130 comprises (as illustrated in FIG. 1B) a personal computer (PC) 9 equipped with a processor 10, clock 16, Read Only Memory (ROM) 12, Random Access Memory (RAM) 11, disk memory 13, disk operating system (contained in ROM 12), input device 14 (operator interface) display terminal 15, and network adapter 17 and network software (contained in ROM 12) for communication between the computer and the network 100 (such as a local area network). Further, each PC 9 is loaded with, and is capable of executing, the conferencing software.

Data terminals 105 and 110 are personal computers comprising means to input text or graphic data into the computer, such as a keyboard, mouse, etc.

Voice data terminals 115 and 120 not only comprise means to input text or graphic data into the computer, but also voice data. Voice data is input into the system using a telephone handset adapted for use with the computer, 106 and 108. Analog voice data is digitized and input and received by adapter hardware and software means to permit voice communication among those network terminals that have voice capabilities and among telephones connected to the conference through phone terminal 125. Those of ordinary skill in the art readily recognize various alternative hardware and software arrangements which accomplish this same result.

Phone terminal 125 provides originating and calling service to a plurality of lines from the Public Switched Telephone Network (PSTN) 135. PSTN 135 provides switching service to telephone sets 140 and 145 via their respective lines 150 and 155, and provides service to phone terminal 125 via lines 160 and 165.

The present invention supplements the existing networking communications technologies by allowing and controlling a networked electronic conference using any or all of the previously described communications means. In this embodiment, participants communicating via the data terminals only transmit or receive text and graphic data. Participants communicating via the voice data terminals only transmit and receive text and graphic data with the data terminals, but transmit and receive text, graphic and voice data with each other. Further, the voice data terminals have voice communication with the telephones connected through the PSTN and phone terminal. The telephones connected through the PSTN and phone terminal only communicate by voice data or keypad input data.

To summarize, in accordance with the present invention, structured and controlled conferences are established. The conference controller software executes on a conference controller computer, 130, and participant software executes on each of the other participant computers, 105, 110, 115, 120 and 125. All computers are connected to the network 100. This allows for the conducting and moderating, by the present invention, of a networked electronic conference among a plurality of participants with absolute precision and control.

A complete archived record of the conference communications is maintained within conference controller 130 and its digital memory (11, 12, and 13), and access is permitted, optionally, to the archived record either during the conference or anytime after completion of the conference. This assures the best dissemination of the conference information possible. Using software stored in Conference Controller 130, anyone authorized can examine the conference record in any desired degree of detail and, optionally, at alternate rates of playback speed without distortion of voice recordings.

Moreover, the conference archived record is optionally reviewed by keyed items. A keyed item is any data defined to be associated with certain archived record data.

Software within the conference controller 130 and its digital memory (11, 12, and 13) establish controls for communications within a subset of the participant communications apparatus (105, 110, 115, 120, etc.) This conferencing permits a "side-bar" conference arrangement.

Figure 2:
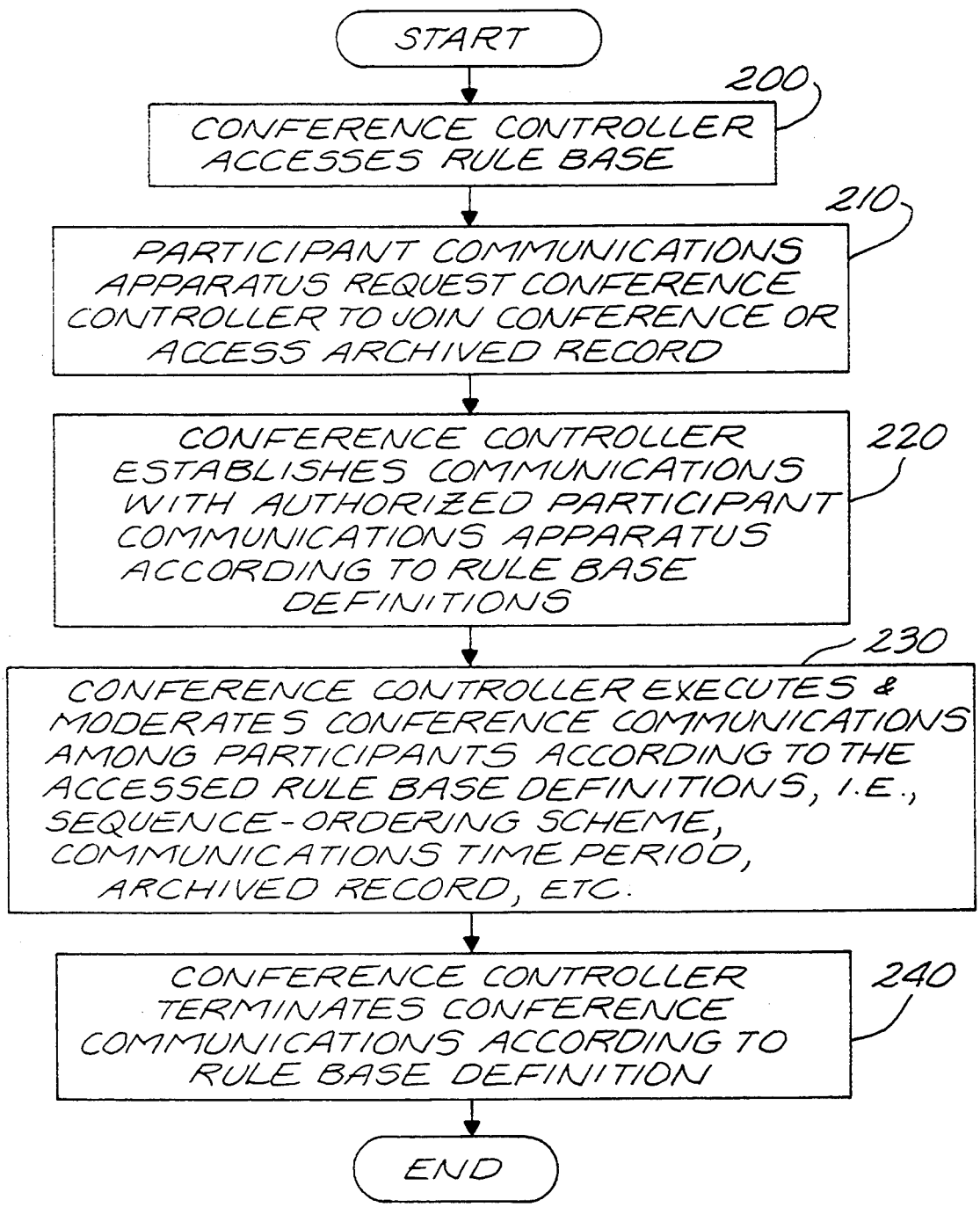
FIG. 2 is an overview flow chart diagram illustrating the steps carried out according to general principles of the preferred embodiment.

FIG. 2 illustrates an overview flow chart of steps carried out according to general principles of the invention for conducting and controlling a networked electronic conference.

The first step, 200, taken by the conference controller is selecting and accessing a rule base. The rule base is a database of a plurality of sets of conference rules which govern the conference proceedings and communications. The rule base is formed by whatever means desired, such as by a human governor operator specifying which rules will become part of the rule base, or by pre-determined sets of conference rules grouped together by artificial intelligence methods.

Example data which makes up the rule base is a sequence-ordering scheme indicating: who speaks when and for how long; conference time; authorized participants; whether speaker interrupts are allowed; whether a speaker is allowed more time if requested; what means of communication are allowed (i.e., text, graphic, voice, video, etc.); whether voting will occur; whether voice scrambling will occur for anonymity; scheduling priorities, etc.

The rule base may be selected from a previously defined rule base, or from a plurality of previously defined rule bases. The rule base comprises virtually an unlimited number of options by which the conference is governed. The conference controller accesses and interprets the rule base, and executes a conference according to the options defined in the rule base.

After the rule base has been accessed, participant communications apparatus then request to join a conference, 210. Conference participants establish a provisional communications connection with the conference controller either through their workstation or personal computer, or through the telephone. The participant then signals the controller that he wants to access a particular conference. The conference controller only allows authorized participants, as defined by the selected rule base, to enter a conference or access information from a previously recorded conference. In the preferred embodiment, authorization is by password or security code.

If participant authorization is affirmative according to the selected rule base, the conference controller then establishes a point to point session connection between the requesting participant communications apparatus and itself, 220. Communication means, such as voice, text, graphics, video, etc., are also established for the conference session according to the selected rule base. Communications are established between the conference controller and each authorized participant that requests to join the conference.

Once communication is established among the networked participants, the execution of a conference proceeds, 230.

The conference controller conducts and moderates all conference communications and proceedings among the participants according to the selected rule base. Participant speakers are: prioritized and granted speaking time according to the defined sequence-ordering scheme; each participant is allowed to communicate according to a defined communications time-period; a conference archived record is maintained in storage; speaker interruptions are handled; scheduling and conducting conference events such as voting are controlled; dissemination of information is managed, including conference archived records, etc.

Finally, when the conference is over, either rule base activated or otherwise, participant communications connections with the conference controller are terminated, 240. The conference is completed in a structured, orderly and efficient fashion according to the rule base selected.

Figure 3:
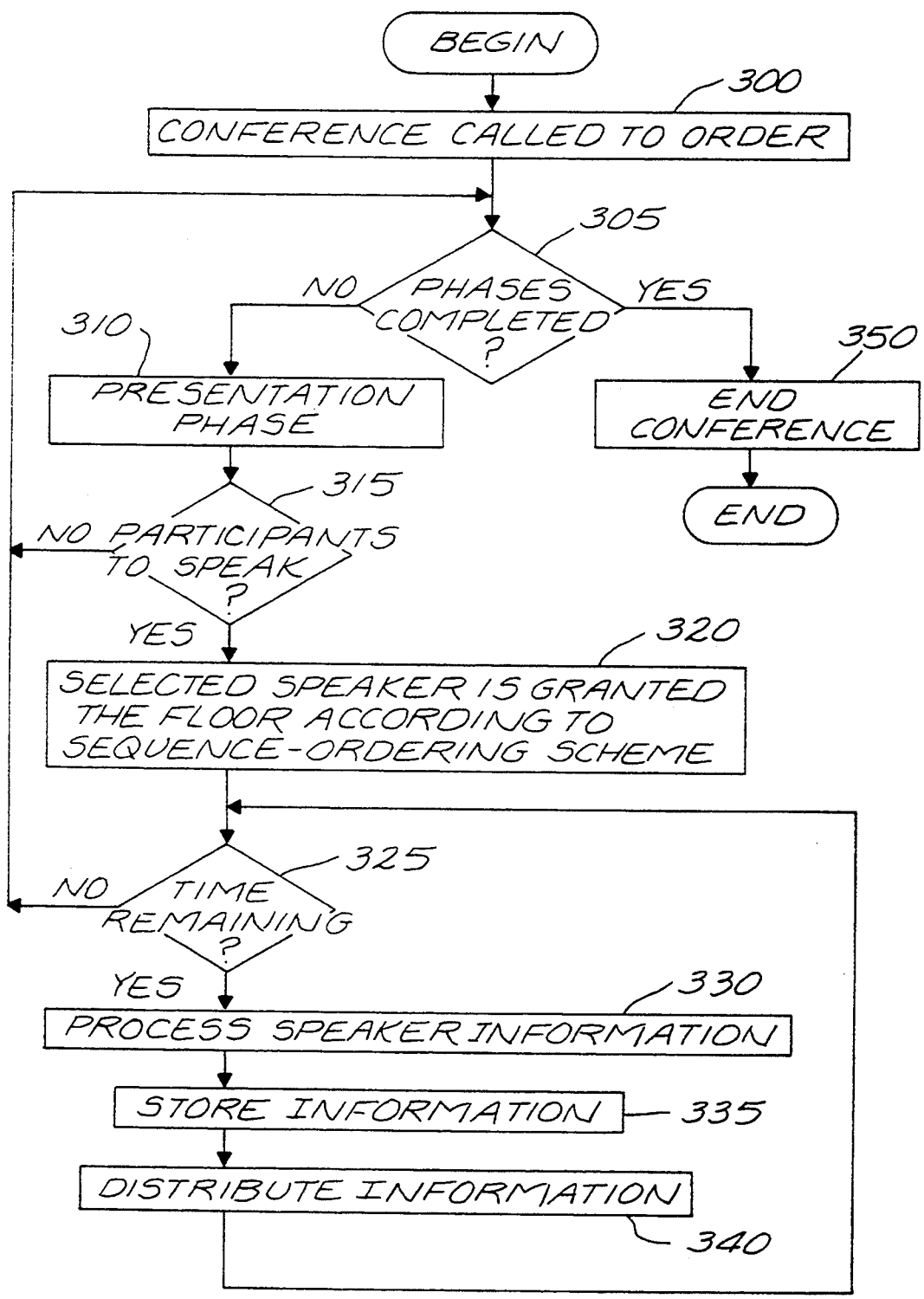
FIG. 3 is a flow chart diagram illustrative of the steps carried out for controlling participant communications sequence-ordering in a presentation phase of a conference in the preferred embodiment.

FIG. 3 is a flow chart diagram of the steps carried out for sequence-ordering of participant communications in a presentation phase of an illustrative conference session governed according to an illustrative rule base by the present invention conference administration system. First, the conference session is called to order, 300. This is optionally accomplished by the conference controller process acting upon the rule base alone, or by operator intervention through an operator interface in conjunction with the selected rule base.

Next, 305, it is determined whether the conference is complete, or whether a "phase" of the conference is to be administered, such as a "presentation" phase, "summation" phase, "voting" phase, etc. In the event the initial phase is for presentation of material by participants, 310, the conference controller determines whether or not there are participants who are scheduled to speak but have not been granted the "floor" to make their presentation, 315. This is done in accordance with the rule base and sequence-ordering scheme defined therein. The conference controller then selects a speaker, in accordance with the current sequence-ordering scheme, and that speaker is granted the floor for a prescribed communications time-period, 320.

So long as the speaker has time remaining in his allocated communications time-period, 325, any material presented by the speaker is processed 330, stored 335, and distributed 340, to the participants as required by the rule base. Not all participants receive the same material. For example, some participants receive the material as presented by a speaker, and other participants receive a translation of that material, such as a language translation.

While the communications time-period has not expired for the participant that has been allocated the "floor" to speak, the conference controller prohibits all other participants from being granted the "floor". This is accomplished by sending a predefined signal to the current speaker, "speaker on", indicating he has the floor and which allows his communications to be broadcast to other participants as controlled by the conference controller. Meanwhile, the other participants receive a signal, "speaker off". The "speaker off" signal is encoded in the conference system to effectuate a bar of broadcasting of any data to other participants from such "speaker off" designated participants.

Finally, throughout the conference, each participant receives conferencing status messages. For example, each participant is given a display of: a list of participants who are to be granted the floor indicating the current sequence-ordering scheme; the communications time-period associated with each respective participant when granted the floor; time remaining for the current speaker; speaker interrupt capabilities, if allowed; and so forth. Moreover, when the current speaker's communications time-period is about to expire, a warning message is transmitted, and then, upon expiration of the time-period "speaker off" signal. The next speaker to be granted the floor receives a "speaker on" signal, and the progression continues through the sequence-ordering scheme in a orderly fashion until all participants that have been defined to be allowed to speak have had their respective turn.

Although not shown in FIG. 3, but as previously indicated, during the course of a presentation the speaker is warned when the communications time-period for presentation is about to expire. The conference rule base may provide for a speaker to request additional time to complete a presentation or to request another participant to yield time from their allocation. If a speaker gains time from either of these options, the presentation continues until the new time is expired, 325. When no time remains, the current speaker loses the floor. The governor determines whether or not the phase is completed, 305, 310, and whether there remain participants who are scheduled to speak but have not yet been selected, 315.

According to the sequence-ordering scheme, each selected speaker is automatically allowed to communicate in an orderly fashion, and is only subject to interruptions if so defined in the rule base. Each selected speaker proceeds to present material which is processed, stored, and distributed as described above.

Moreover, although not shown in FIG. 3, a participant may change his or her "active" participation status in a conference to a "hold" status mode. A participant may signal the conference controller accordingly, then tend to other business while in the "hold" mode, and then return to "active" participation at a later time. The conference controller handles the conference participant's status mode change accordingly without problem. For example, upon executing the sequence-ordering scheme, the conference controller responds in recognition that a participant is on a "hold" status, and assigns an alternate speaker the floor time as necessary.

When the last speaker has been served, the current presentation phase is ended. The governor determines whether or not there are additional phases which remain in the conference schedule, 305. For example, after the first presentation phase, there may be either a summary phase or a voting phase which the governor initiates and conducts accordingly. There is no limit, other than a practical limit, as to the number of phases in a conference that can be administered and moderated by the present invention. On the other hand, if no phases remain in the schedule, the conference is ended, 350, and the participants are released from the conference.

Figure 4:
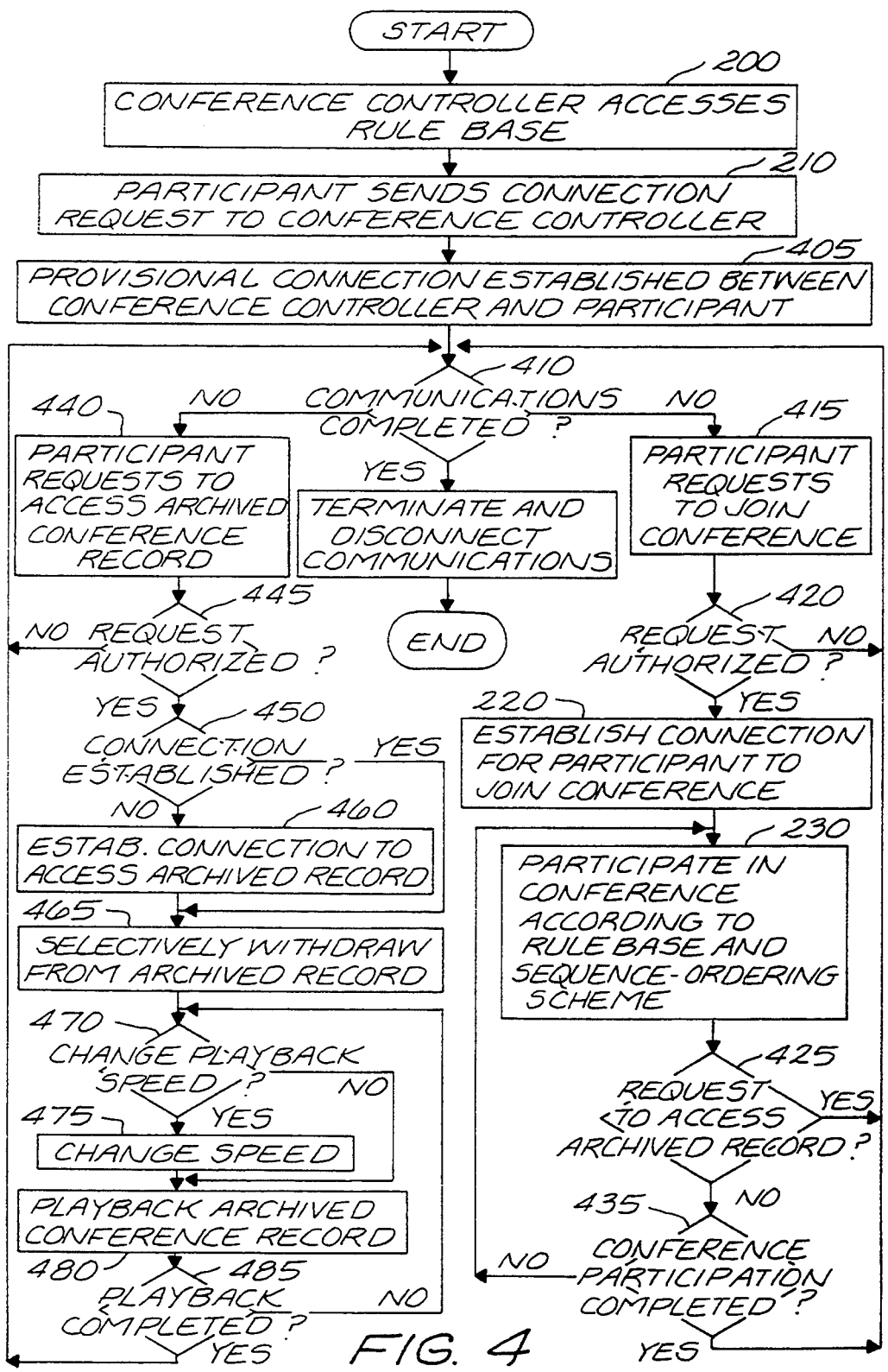
FIG. 4 is a flow chart diagram illustrating the steps carried out between participant communications apparatus and the conference controller for establishing communications and participating in a conference, and for accessing an archived record of a conference in the preferred embodiment.

FIG. 4 is a flow chart diagram illustrating the steps carried out between participant communications apparatus and the conference controller for establishing communications and participating in a conference, and for accessing an archived record of a conference. FIG. 4 is a more detailed illustration of FIG. 2.

The conference controller accesses a selected rule base 200, which is interpreted and executed to administer and moderate a conference. The conference controller then waits for a participant communications apparatus to send a connection request to the conference controller, 210. Once a connection request is sensed, a provisional connection is established, 405. The provisional connection is simply to allow the conference controller to determine authorization status of the requesting participant. At this point, communications are not fully complete, 410. Therefore, if the connection request is to join a conference, 415, and authorization is affirmative according to the conference controller's rule base for the conference requested, 420, then the controller allows a complete conference communications connection to be established with the requesting participant process, 220. This complete communications connection is a point to point session connection in which messages are convey with 100% reliability.

The participant is now joined with the conference and is subject to the governing rule base and sequence-ordering scheme for that conference, 230. During execution of a conference, 230, a participant optionally accesses the conference archived record, 425. If access to the archived record occurs during the execution of a conference, flow transitions from 425 through 410 and 440 to 445, where the access request is handled accordingly. Otherwise, communications continue until conference participation is completed, 435, 410, and a disconnect occurs, 240.

On the other hand, if the participant connection request is to access an archived record, 440, and access is authorized according to the rule base for that archived record, 445, then the participant is given access to selectively withdraw data from the archived record, 465. If this access request is from a participant that is not currently connected and joined into an ongoing conference, a connection must be established, 450 and 460.

This access to the archived record optionally occurs real time (i.e., a flow transition directly from 425), concurrently while a conference is in session and actually being recorded to the archived record. Thus, a new connection need not be established, 450, 465.

A participant has the option to playback a voice recorded archived record at the normal recorded real time rate of speed, or at a different rate of speed without distortion, 470, for an enhanced review of the recorded conference communications and proceedings. For example, if a person arrives late into a conference session, he or she may want to playback the existing archived record at an accelerated speed to catch up on what has occurred in the conference. Operations 475 and 480 effectuate this speed change and allow for an accelerated playback of the archived record. On the other hand, a participant may want to playback the record at a slower speed to review particular details.

Although not shown in FIG. 4, an authorized participant is able to playback the archived record in its entirety. Optionally, however, a participant may selectively playback only certain portions of the record based on selected keyed item criteria. In this latter case, a participant chooses to only playback those portions of the conference record where a particular participant or group of participants spoke or communicated. This allows the playback to be focused as much or as little as is necessary to effectuate an efficient and effective review of the archived record.

When playback is completed, 485, a participant may optionally request access to another conference archived record, 410 and 440, or terminate and disconnect communications, 410 and 240. On the other hand, if a participant has accessed an archived record while concurrently joined with an ongoing conference (i.e., flow transition from 230), upon completion of review of the archived record, 485, flow of control will be returned to 230.

Figure 5A:
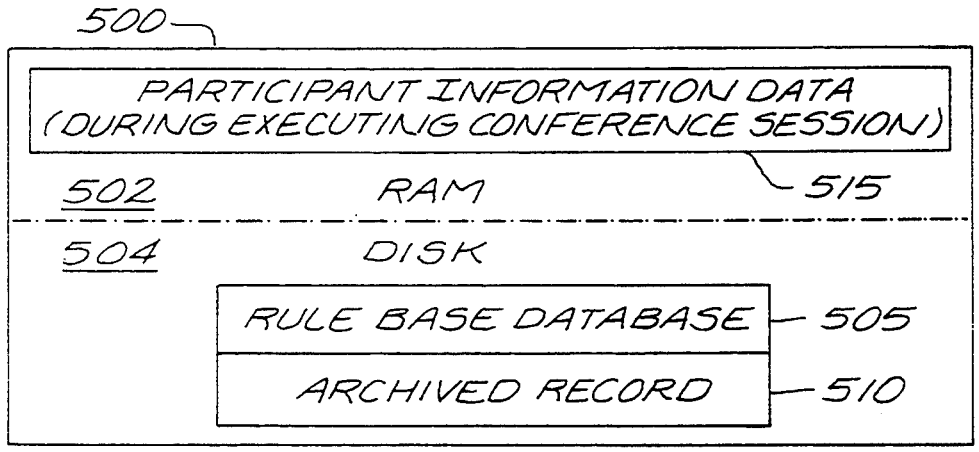
FIG. 5A is a block diagram representative of the preferred storage medium for storing participant information data, rule base data, and an archived record.

FIG. 5A is a block diagram representative of a storage medium, 500, for storing participant information data, rule base data, and an archived record. Such a storage medium can be any apparatus commonly used in computers today, such as volatile RAM, 502, or more stable storage mediums such as disk drive units, 504.

A portion of a disk drive unit 504 contains the rule base database 505, and the conference archived record 510. Within a portion of RAM 502, participant information data is stored, 515, during a currently executing conference session.

Upon beginning execution of a conference, the conference controller accesses the rule base, 505, interprets the definitions in the rule base that govern the conference proceedings, and transfers the information from disk 504 into RAM 502 as executing conference session participant information data 515. This allows for quick and easy access by the conference controller for administering and moderating a conference.

Figure 5B:
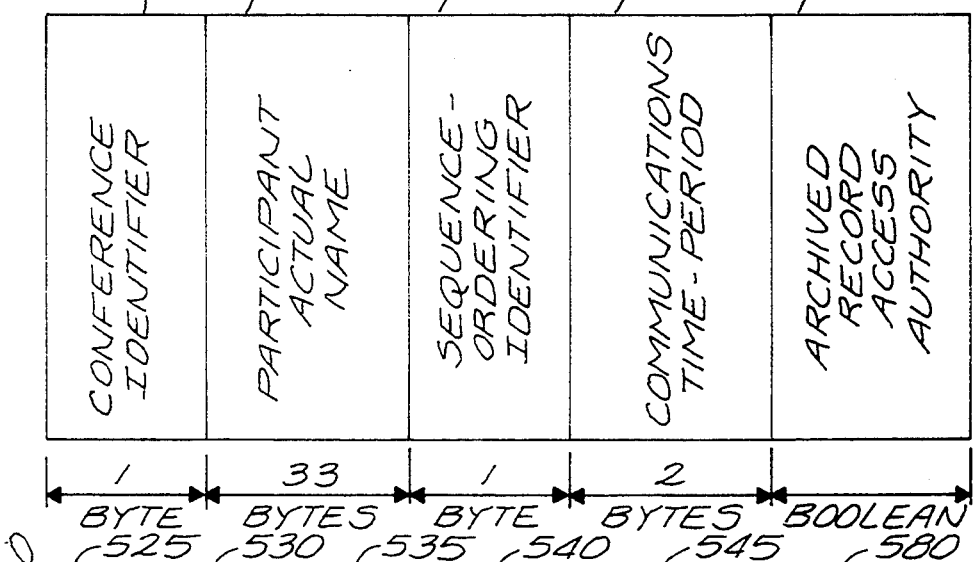
FIG. 5B is a block diagram illustrating the preferred format of participant information data as stored in one embodiment of the preferred storage medium of FIG. 5A.

FIG. 5B depicts the preferred format 550 of how the rule base is defined in disk storage medium 504, FIG. 5A. This formatted data includes a conference identifier, 525, which identifies a conference to which a participant may join; a participant's actual name that will be used as identification to join the conference, 530; sequence-ordering of participants for granting participants the "floor" to speak, 535; communications time-period data indicating how long a participant is granted the "floor", 540; and data indicating whether a participant is allowed to access the archived record, 545.

Figure 5C:
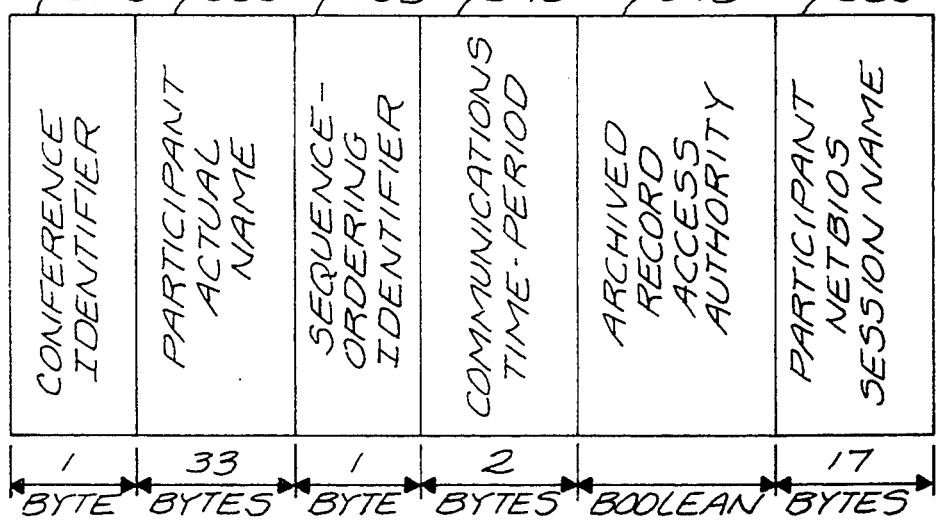
FIG. 5C is a block diagram illustrating the preferred format of participant information data as stored in another embodiment of the preferred storage medium of FIG. 5A.

FIG. 5C, depicts the preferred format 570 of how participant information data 515 is defined in RAM storage medium 502, FIG. 5A, during an executing conference session. This is the same information depicted in 550, FIG. 5B, but further includes data such as participant NetBios session name, 580. The NetBios session name 580 is obtained when a point to point session connection between the conference controller and a participant communications apparatus is established. This session name identifies the actual messaging session connection between a particular participant communications apparatus and the conference controller. All messages exchanged between the conference controller and a participant are 100% reliable because of this session connection identifier.

Figure 6A:
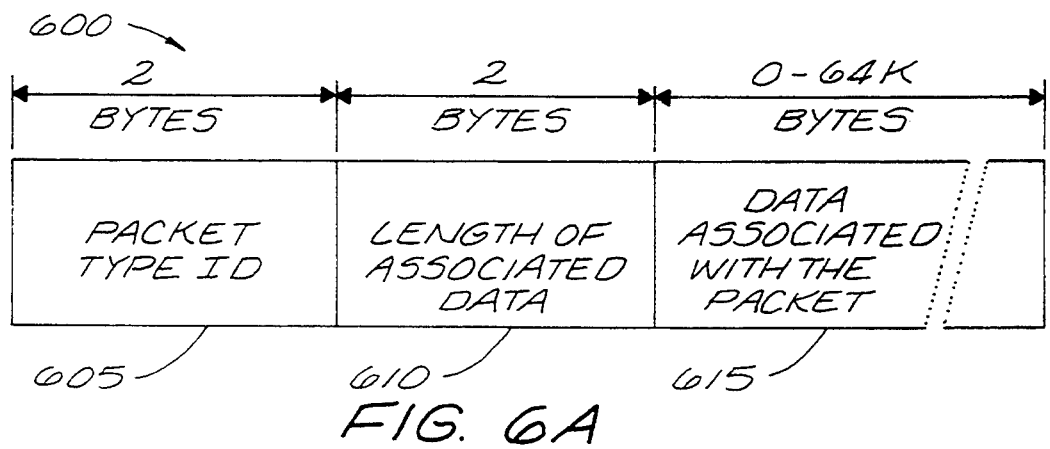
FIG. 6A is a block diagram illustrative of the general format of data transmitted between the conference controller and participant communications apparatus in the preferred embodiment.

FIG. 6A depicts a data format 600, used for defining data packets transmitted between participant communications apparatus and the conference controller in the preferred embodiment. Data is transmitted as packets which includes a 2-byte packet type identification, 605; a 2-byte indicator of length of associated data, 610; and a 0–64K byte block of data associated with the packet being sent, 615. The data types, in addition to specifying such obvious classifications such as voice, ASCII, etc., identifies professional field specific data such as EKG and vital sign data for the medical field.

Figure 6B:
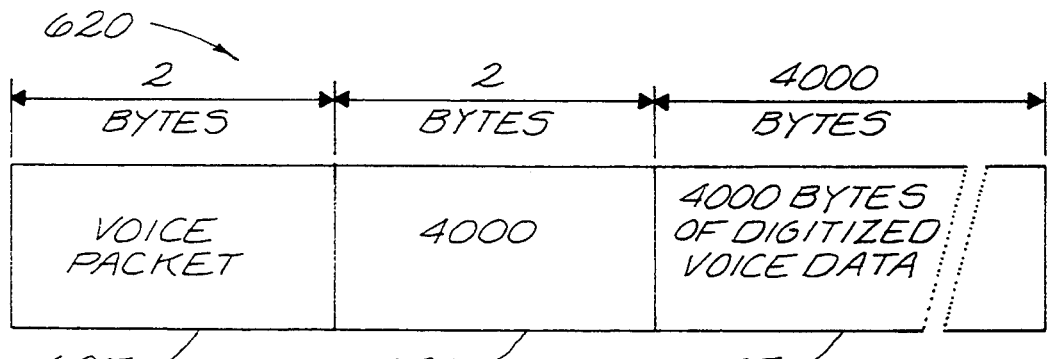
FIG. 6B is a block diagram illustrative of a sample packet of voice data as transmitted between the conference controller and participant communications apparatus in the preferred embodiment.

FIG. 6B depicts a sample format used in the preferred embodiment of a voice packet of data, 620. The first two bytes, 625, indicate that it is voice data being transmitted. The next two bytes, 630, indicate that the length of the associated data being transmitted is 4000 bytes long. Data 635 illustrates that 4000 bytes of actual digitized voice data is associated with the packet for transmission.

Figure 6C:
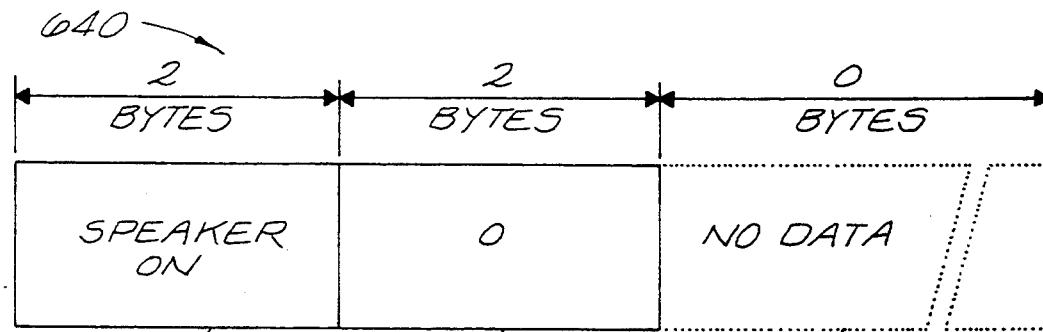
FIG. 6C is a block diagram illustrative of a sample packet of sequence-ordering data as transmitted between the conference controller and participant communications apparatus in the preferred embodiment.

FIG. 6C depicts a sample format, 640, of how the conference controller in the preferred embodiment indicates to a participant communications apparatus that it is that participant's turn to speak. This determination is based upon the sequence-ordering scheme. The conference controller simply signals the participant with a "speaker on" message. The first two bytes in the formatted data, 645, indicate the "speaker on" status. Since this message does not require any data to be sent, the next two bytes, 650, indicate that zero bytes of data are associated with the packet. Further, 655 indicates that no data is associated with the packet and is therefore zero bytes long. The participant communications apparatus receives the "speaker on" signal and responds accordingly without any need for associated data.

Note that the general structure of data in FIGS. 6B and 6C are substantially identical, based upon 6A. This uniformity assists in efficient communications.

Although there are numerous acceptable methods of coding software to administer and moderate a networked electronic conference according to general principles of the present invention as described in FIGS. 1 through 6, one method is as follows.

Figure 7:
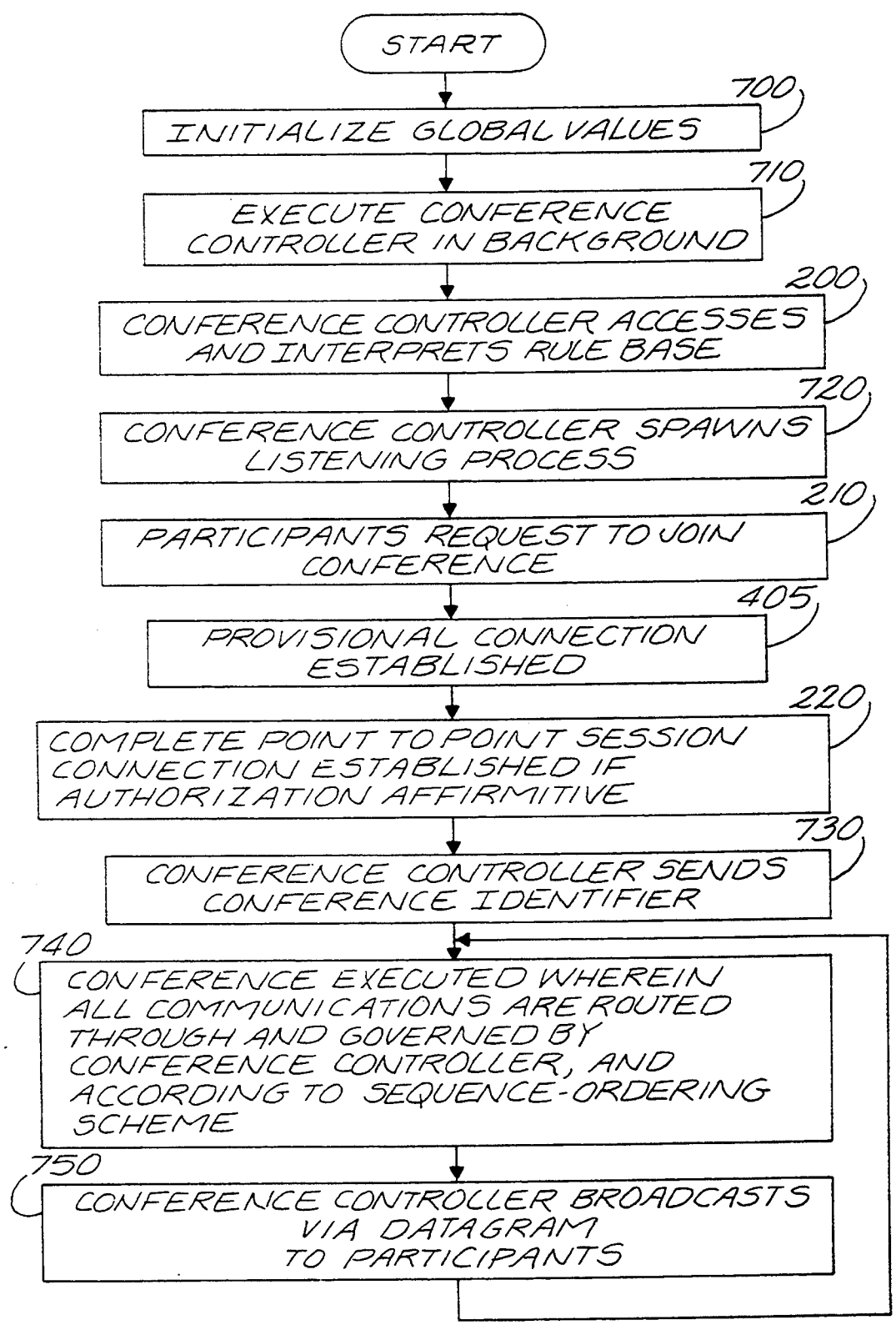
FIG. 7 is a flow chart diagram illustrating the steps carried out for coding a preferred embodiment.

Referring to FIG. 7, the conference controller software comprises code that, to begin with, initializes relevant global status values, 700. Next, the code places the conference controller process in a background execution mode, 710. This relinquishes the conference controller communications device for other use such as operator intervention of the controller process through a separate but concurrently executing operator interface. Once the conference controller process is placed in the background, a rule base database is opened for access, 200. It is read, and interpreted accordingly, to execute and govern the conference.

Thereafter, the controller must listen for and accept network communications connections by authorized conference participants in accordance with the selected rule base. The controller communicates with participant processes through point to point session connections over the communications network. A participant process is a process that is executing a separate piece of software on a remote communications device associated with a conference participant. A session connection is the point to point communication established over the network between the conference controller and the participant communications apparatus by which messages are transferred and exchanged.

To listen for connection requests initiated by participant processes, the conference controller code actually spawns a separate "listening" process, 720. This spawned "listening" code is placed in a sleep-mode status to actually listen for a connection. Upon sensing a session connection request by a participant process, 210, the listening code "wakes-up" and establishes a provisional session connection with the participant process, 405. In this provisional connection, the listening code reads the rule base to determine if the participant process is authorized for a full and complete session connection to join a conference or access an archived record.

If authorization is affirmative, a full and complete point to point session connection is established between the conference controller and the participant communications apparatus, 220. The controller then sends the participant a conference broadcast identifier, along with other pertinent initial session connection messages, 730. This conference broadcast identifier is used by the conference controller and participants as a key to identify the conference communications to which they are joined. The conference controller optionally has multiple distinct conference sessions executing simultaneously. Therefore, to be sure respective conference communications are confined to appropriate respective conference participants, all messages broadcast by the conference controller, regarding any particular respective conference, retain the respective broadcast identifier. Participants will receive only those messages broadcast by the conference controller that match their respective broadcast identifier that they received upon initially connecting with the conference controller.

Once a session connection is established between each of the authorized participants and the controller, the controller will then continue to read and interpret the rule base to execute and govern the conference among the joined participants. All messages sent by any participant within the conferencing context are routed directly to the conference controller first, 740. The controller then processes each message according to the selected rule base, and also writes the message to the archived record file. This communication between participants, the conference controller, and the archived record file is always complete and accurate without any concern for loss of data because of the point to point messaging communication means used.

The conference controller then distributes the messages received from a particular participant, to other participants joined in the conference through broadcast datagrams, 750. The datagrams retain the conference broadcast identifier to be sure only authorized participants receive the broadcast datagram information. Broadcast datagrams are used to transmit information to other participants because of the speed involved. If the messaging means were used to communicate to other participants, the conference controller would have to send each participant the message one at a time through the respective established point to point session connections. However, by using the broadcast datagram means of communication, the conference controller need only send the communication out once, and all authorized participants receive the transmission accordingly. Transmission reliability of the broadcast datagrams is increased by breaking the datagrams into very small packet sizes. Therefore, any data loss that may occur, as is inherent with broadcast datagram communication, will be minimized to an insignificant and relatively undetectable level because of the small packet sizes.

The conference controller maintains conference order by implementing the sequence-ordering scheme defined in the rule base, 740. The controller first accesses the rule base and interprets it to determine the order of participant communications and the associated communications time-period for each participant. The controller signals a participant that it will be granted the "floor" to speak first, by sending it a data packet, "speaker on". The controller retains in memory which participant has the "floor". The controller then accepts messages sent by the participant who has the floor, archives any information transmitted to the archived record, and broadcasts the messages through datagram packets to other conference participants.

Meanwhile, the conference controller does not accept any messages sent by other participants, unless the rule base defines certain interrupt privileges or other options for such participants to communicate while the current speaker has the "floor". Since the controller does not accept messages by the participants that do not currently have the "floor", their messages are not broadcast out, like the speaker who has the "floor". Only when the communications time-period for the current speaker has expired will the controller grant the "floor" to the next participant as defined by the rule base. With this method, the conference controller maintains complete order and disseminates appropriate information to conference participants according to the sequence-ordering scheme.

What has been described above are the preferred embodiments of a method and apparatus for conducting and moderating a networked electronic conference. It is clear that the present invention provides a powerful tool for facilitating and improving electronic conferencing. It is apparent that many modifications to the disclosed invention are possible without departing from the true spirit and scope of the invention. While specific examples have been given, it is apparent that other alternative methods are equivalent and fall within the scope of this invention.

What is claimed is:

1. A conference system, comprising:
 a) a plurality of participant communications apparatuses;
 b) a digital storage means for storing data indicative of a rule based communications sequence-ordering scheme; and
 c) a conference controller communications apparatus having sequencing means for controlling sequence-ordering of communications among said plurality of participant communications apparatuses according to said sequence-ordering scheme.

2. The conference system according to claim 1, further comprising an operator interface communicating with said conference controller communications apparatus, wherein said conference controller communications apparatus includes means for modifying said sequence-ordering scheme in said digital storage means based upon data received from said operator interface.

3. The conference system according to claim 2 wherein said sequence-ordering scheme further includes communications time-period data, wherein said conference controller communications apparatus further comprises:
 a) clock means for generating a time data-stream indicative of time passage; and
 b) means for progressing through said communications sequence-ordering scheme based upon said time data-stream and said communications time-period data.

4. The conference system according to claim 3, wherein said conference controller communications apparatus further comprises side-bar conferencing means for controlling communications within a subset of said plurality of participant communications apparatuses, said subset being less than the set of all of said participant communications apparatuses.

5. The conference system according to claim 3, wherein said digital storage means further includes an archived record of information indicative of communications exchanged among said participant communications apparatuses, said archived record including a recordation of said time data-stream indicative of time passage.

6. The conference system according to claim 5, further comprising means for selectively retrieving said archived record of information from said digital storage means.

7. The conference system according to claim 6, further comprising means for simultaneously operating said means for selectively retrieving and said means for progressing.

8. The conference system according to claim 6, wherein said means for selectively retrieving includes means for retrieving after completion of communications among said participant communications apparatuses.

9. The conference system according to claim 6, wherein said means for selectively retrieving includes:
 a. means for identifying targeted data associated with an identified criteria, said targeted data being a subset of said archived record of information;
 b. means for accessing said targeted data; and
 c. means for communicating said targeted data to a subset of said participant communications apparatuses.

10. The conference system according to claim 6, wherein said means for selectively retrieving includes means for retrieving at a rate faster than real time without voice distortion.

11. The conference system according to claim 6, wherein said means for selectively retrieving includes means for withdrawing at a rate slower than real time without voice distortion.

12. The conference system according to claim 6, wherein said conference controller communications apparatus is a participant communications apparatus.

13. An electronic conference system, comprising:
 a) a storage means for storing data indicative of a rule based communications sequence-ordering scheme;
 b) a plurality of participant communications apparatuses having means for transmitting and receiving data; and
 c) a conference controller for controlling communications among said participant communications apparatuses having means for
  i) receiving transmission data from said participant communications apparatuses, based upon said sequence-ordering scheme; and
  ii) broadcasting said transmission data to a selected subset of said participant communications apparatuses, said subset being less than the set of all of said participant communications apparatuses.

14. The conference system according to claim 13, further comprising an operator interface communicating with said conference controller, wherein said conference controller includes means for modifying said sequence-ordering scheme in said storage means based upon data received from said operator interface.

15. The conference system according to claim 14, wherein said sequence-ordering scheme further includes time passage data, and further including a clock means for generating a time data-stream indicative of time passage, wherein said conference controller further includes means for:
 a) associating each time passage datum with the broadcasting of data from an identified participant communications apparatus;
 b) setting a counter to a value associated with the time passage datum;
 c) based upon said time data-stream, decreasing said counter; and
 d) discontinuing broadcasting data from said identified participant communications apparatuses when said counter reaches zero.

16. The conference system according to claim 15, wherein said conference controller further includes means for notifying said participant communications apparatus when said counter reaches a predetermined value.

17. The conference system according to claim 16, wherein said storage means further includes an archived record of information indicative of communications exchanged among said participant communications apparatuses, wherein said conference system further includes means for selectively retrieving said archived record of information from said digital storage means.

18. The conference system according to claim 17, wherein said means for selectively retrieving is simultaneously operated while said means for broadcasting is operated.

19. The conference system according to claim 17, wherein said means for selectively retrieving is operated while said means for broadcasting is not operating.

20. The conference system according to claim 17, wherein said selectively retrieving includes:
 a) means for identifying specified elements of said archived record information; and
 b) means for accessing said specified elements.

21. The conference system according to claim 17, further including:
 a) means for presenting auditory data from said storage means to a participant communications apparatus at a speed varying from real time; and
 b) means for reducing voice distortion on said auditory data.

22. The conference system according to claim 21, wherein said speed varying from real time is faster than real time.

23. The conference system according to claim 21, wherein said speed varying from real time is slower than real time.

24. The conference system according to claim 17, wherein said conference controller is a participant communications apparatus.

25. A method of administering and moderating a conference among a plurality of participant communications apparatuses and a conference controller, all being interconnected by a local area network, comprising:
 a) storing scheme-data in a storage medium, said scheme-data indicative of a rule based communications sequence-ordering scheme for transmitting and exchanging communications among said participant communications apparatuses; and
 b) controlling communications transmitted and exchanged among said participant communications apparatuses by
  i) receiving transmission data from said participant communications apparatuses, based upon said scheme data and
  ii) broadcasting said transmission data, via said local area network, to a selected subset of said participant communications apparatuses, said subset being less than the set of all of said participant communications apparatuses.

26. The method according to claim 25, further including the step of modifying said scheme-data based upon data received from an operator interface.

27. The method according to claim 26, further including the step of terminating the step of broadcasting said transmission data when a broadcast transmission time lapse exceeds a time-period defined by said scheme-data.

28. The method according to claim 27, further including the step of storing an archived record of information indicative of communications exchanged among said participant communications apparatuses.

29. The method according to claim 28, further including the step of selectively retrieving said archived record of information from said digital storage means.

30. The method according to claim 29, wherein said step of selectively retrieving includes the steps of retrieving while communications are being exchanged among said participant communications apparatuses.

31. The method according to claim 29, wherein said step of selectively retrieving includes the step of retrieving after the completion of communications among said participant communications apparatuses.

32. The method according to claim 29, wherein said step of selectively retrieving includes the steps of:
   a) identifying specified elements of said archived record information; and,
   b) accessing said specified elements.

33. The method according to claim 29, wherein said step of selectively retrieving includes the step of compensating for voice distortion due to altered speeds of transmission.

* * * * *